US010949526B2

United States Patent
Kermes et al.

(10) Patent No.: US 10,949,526 B2
(45) Date of Patent: Mar. 16, 2021

(54) USER DEVICE AUTHENTICATION

(71) Applicant: salesforce.com, inc., San Francisco, CA (US)

(72) Inventors: Leonardo Skipper Kermes, San Francisco, CA (US); Winston Chir, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 91 days.

(21) Appl. No.: 15/880,428

(22) Filed: Jan. 25, 2018

(65) Prior Publication Data

US 2019/0228144 A1 Jul. 25, 2019

(51) Int. Cl.
*G06F 21/44* (2013.01)
*G06F 21/32* (2013.01)
(Continued)

(52) U.S. Cl.
CPC .............. *G06F 21/44* (2013.01); *G06F 21/32* (2013.01); *G06F 21/6218* (2013.01);
(Continued)

(58) Field of Classification Search
CPC ....... H04L 9/00; H04L 9/3234; H04L 9/3226; H04L 9/3268; H04L 9/3271;
(Continued)

(56) References Cited

U.S. PATENT DOCUMENTS

| | | | | |
|---|---|---|---|---|
| 2002/0159601 | A1* | 10/2002 | Bushmitch | H04L 29/06 380/277 |
| 2005/0154886 | A1* | 7/2005 | Birk | H04L 63/105 713/168 |

(Continued)

OTHER PUBLICATIONS

V. Spoorthi • K. Chandra Sekaran; Mobile single sign-on solution for enterprise cloud applications; 2014 First International Conference on Networks & Soft Computing (ICNSC2014) (pp. 273-277); (Year: 2014).*

(Continued)

*Primary Examiner* — Luu T Pham
*Assistant Examiner* — Chao Wang
(74) *Attorney, Agent, or Firm* — Holland & Hart LLP

(57) ABSTRACT

Methods, systems, and devices for user device authentication are described. In some systems, an application server may host a secure application utilizing user device verification. A proxy server may perform a certificate challenge with a user device to determine whether the user device is authorized to access the application, and may transmit a login request and authentication information to the application server based on the result of the challenge. The application server may determine whether the certificate challenge was successful, and may verify whether the proxy server is a valid proxy for the application. If these validations are successful, the application server may transmit an authorization message (e.g., an encrypted ticket) to the user device for a login procedure. The user device may send a login request with the authorization message directly to the application server (e.g., without further tunneling through the proxy) to initiate a login procedure.

19 Claims, 12 Drawing Sheets

(51) Int. Cl.
G06F 21/62 (2013.01)
H04L 29/06 (2006.01)
H04L 9/32 (2006.01)

(52) U.S. Cl.
CPC .......... *H04L 9/3226* (2013.01); *H04L 9/3234* (2013.01); *H04L 9/3268* (2013.01); *H04L 9/3271* (2013.01); *H04L 63/0281* (2013.01); *H04L 63/0428* (2013.01); *H04L 63/083* (2013.01); *H04L 63/0823* (2013.01); *H04L 63/0861* (2013.01); *H04L 63/0884* (2013.01)

(58) Field of Classification Search
CPC ............ H04L 63/0884; H04L 63/0281; H04L 63/0428; H04L 63/0823; H04L 63/083; H04L 63/0861; H04L 51/046; G06F 21/44; G06F 21/621; G06F 21/32; G06F 2221/2107; H04W 12/06
See application file for complete search history.

(56) References Cited

U.S. PATENT DOCUMENTS

| | | | | |
|---|---|---|---|---|
| 2007/0165579 A1* | 7/2007 | Delibie | ................... | H04L 67/12 370/338 |
| 2011/0194692 A1* | 8/2011 | Carpenter | ........... | H04L 63/0428 380/255 |
| 2012/0167193 A1* | 6/2012 | Gargaro | .............. | H04L 63/0846 726/8 |
| 2012/0284786 A1* | 11/2012 | Somani | ............... | H04L 63/0815 726/7 |
| 2012/0331529 A1* | 12/2012 | Ibel | ...................... | G06F 21/6218 726/4 |
| 2014/0068736 A1* | 3/2014 | Agerstam | ............. | H04W 12/06 726/7 |
| 2014/0189842 A1* | 7/2014 | Wang | .................. | H04L 63/0807 726/9 |
| 2015/0227749 A1* | 8/2015 | Schincariol | ......... | H04L 41/0806 726/28 |
| 2016/0157098 A1* | 6/2016 | Gupta | ..................... | H04L 67/02 726/6 |
| 2017/0353444 A1* | 12/2017 | Karangutkar | ....... | H04L 63/0815 |

OTHER PUBLICATIONS

Brainard, J.G.; SecurSight: an architecture for secure information access; Proceedings 15th Annual Computer Security Applications Conference (ACSAC'99) (pp. 349-357); (Year: 1999).*

Sumit Goswami • Sudip Misra • Mukesh Mukesh; A Replay Attack Resilient System for PKI Based Authentication in Challenge-Response Mode for Online Application; 2014 3rd International Conference on Eco-friendly Computing and Communication Systems (pp. 144-148); (Year: 2015).*

* cited by examiner

USER DEVICE AUTHENTICATION

FIELD OF TECHNOLOGY

The present disclosure relates generally to database systems and data processing, and more specifically to user device authentication.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, the cloud platform may support secure applications, where a user attempting to access a secure application may need to input valid user credentials using a valid user device. However, validating the user device at an application server may result in security risks and problems of scale. For example, even allowing an unauthorized user device to display an application login screen may help an unauthorized user determine how to access the application without valid credentials or a valid device. Additionally, implementing user device authentication at each application server running a secure application within a system (e.g., a multi-tenant database system) may introduce large amounts of overhead and redundancy into the system.

DETAILED DESCRIPTION

Figure 1:
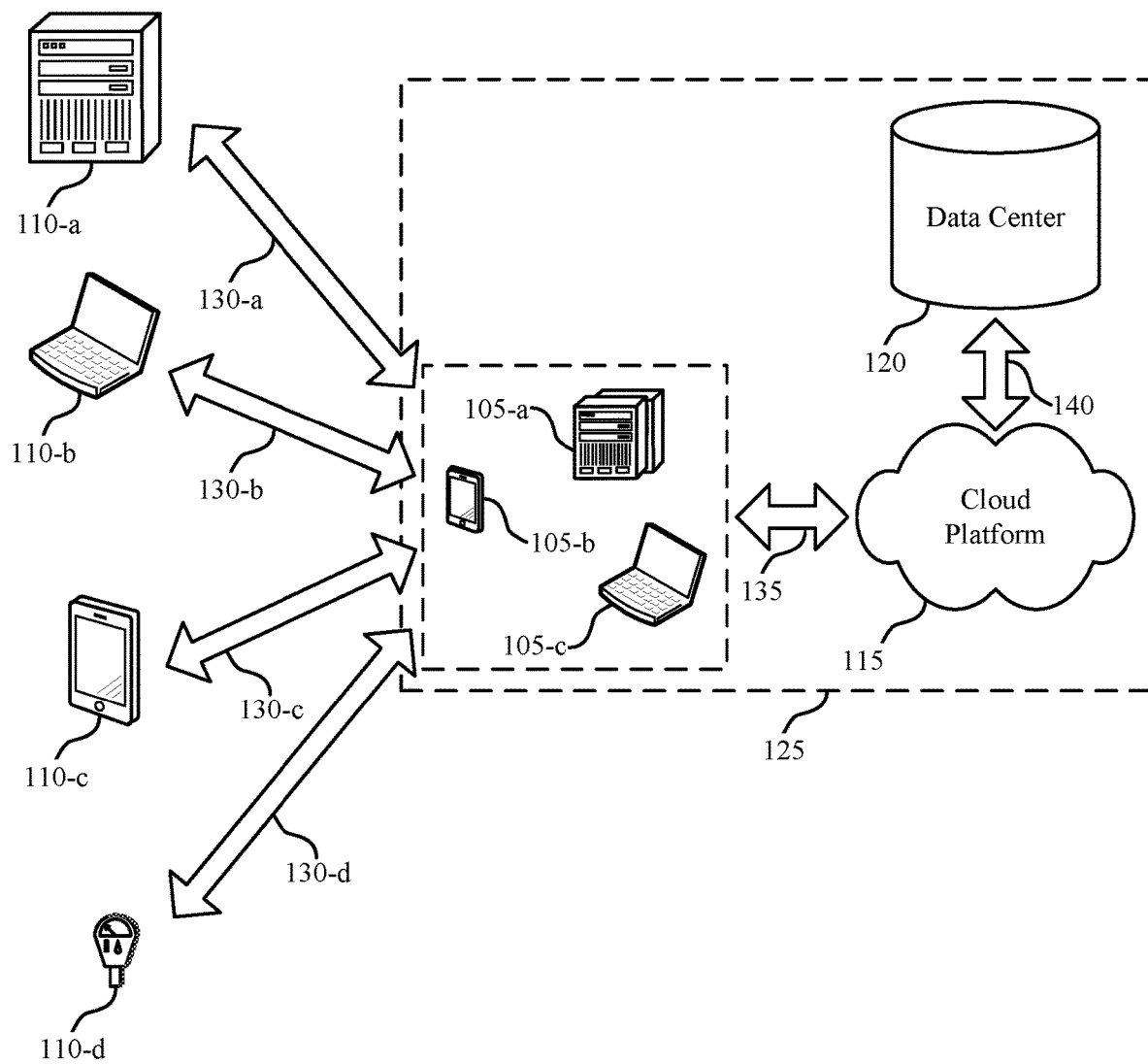
FIG. 1 illustrates an example of a system for user device authentication that supports user device authentication in accordance with aspects of the present disclosure.

In some systems (e.g., massive multi-tenant database systems), one or more application servers may host a secure application utilizing user device verification. For example, for a user device to access the application or a sign-on service for the application, the system may first authenticate the user device. In some cases, the system may utilize a certificate challenge at a proxy server (e.g., a reverse proxy) to authenticate user devices. User devices authorized to access the secure application may contain valid certificates corresponding to the application. The proxy server may receive an indication of a certificate from a user device, and may perform a mutual transport layer security (mTLS) procedure to determine whether the certificate—and, correspondingly, the user device—is valid. If the proxy server determines that the certificate is valid, the proxy server may transmit a login request, along with authentication information, to an application server. By implementing the proxy server, the system may avoid supporting mTLS processes at each application server within the system.

The application server may perform a validation process based on the information received from the proxy server. For example, the application server may identify whether the certificate challenge at the proxy server was successful (e.g., based on receiving the login request, or based on an indication within the login request). Additionally or alternatively, the application server may verify whether the proxy server is a valid proxy server based on the received authentication information. For example, the application server may validate whether a proxy server-specific secret included in the authentication information matches a valid proxy, an Internet Protocol (IP) address associated with the received information matches a valid proxy, or both correspond to a same valid proxy for the secure application or application server. If the validation process is successful, the application server may transmit an authorization message (e.g., an encrypted ticket) to the user device to be used for user device access. The user device may transmit a login request, including the authorization message, directly to the application server (e.g., without using the proxy). The application server may verify that the authorization message is valid, and may grant the user device access to the secure application, or to a login procedure for the secure application, based on the authorization message. By implementing the proxy server for user device authentication, but not tunneling further application traffic through the proxy, the system may efficiently handle server resources without introducing large amounts of latency or redundancy into the authentication process.

Aspects of the disclosure are initially described in the context of an environment supporting an on-demand database service. Additional aspects of the disclosure are described with respect to systems and processes for user device authentication using a proxy. Aspects of the disclosure are further illustrated by and described with reference to apparatus diagrams, system diagrams, and flowcharts that relate to user device authentication.

FIG. 1 illustrates an example of a system 100 for cloud computing that supports user device authentication in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some systems 100, subsystem 125 may support user device authentication. For example, an application server—which may be a component of the cloud platform 115—may authenticate a user device (e.g., a cloud client 105) to access a web page, a login service, or a secure application using a proxy server (e.g., reverse proxy). For example, the proxy server may initially transmit a login request (e.g., a security assertion markup language (SAML) request) and authentication information for a user device to the application server. For example, the authentication information may include a secret (e.g., a unique identifier), a mutual transport level security (mTLS) success or failure indication, or some combination of this information. The application server may use the received authentication information to perform a validation process. The validation process may determine whether to authorize the user device for access to a secure application. For example, a set of user devices may be authorized for access to the application (e.g., cloud clients 105) based on certificates of the user devices, while other user devices (e.g., contacts 110) may not be authorized for access. The application server may transmit an authorization message—which, in some cases, may be an example of an encrypted ticket—to the user device based on a result of the validation process.

Once the user device receives the authorization message, the user device may transmit a second login request (e.g., an SAML request) to the application server, where the second login request may additionally include the authorization message (e.g., in addition to the SAML request). In some cases, the authorization message may include a ticket to grant the user device access to the application server or a specific application hosted on the application server. This authorization message and second login request may be received at the application server and may initiate a login procedure for the user device (e.g., in order to login to the specific application hosted on the application server). For example, the application server may send the user device a login form to access the application server if the user device is authenticated. Based on user input to the login form, a user operating an authenticated user device may gain access to a secure application hosted by the application server.

Figure 2:
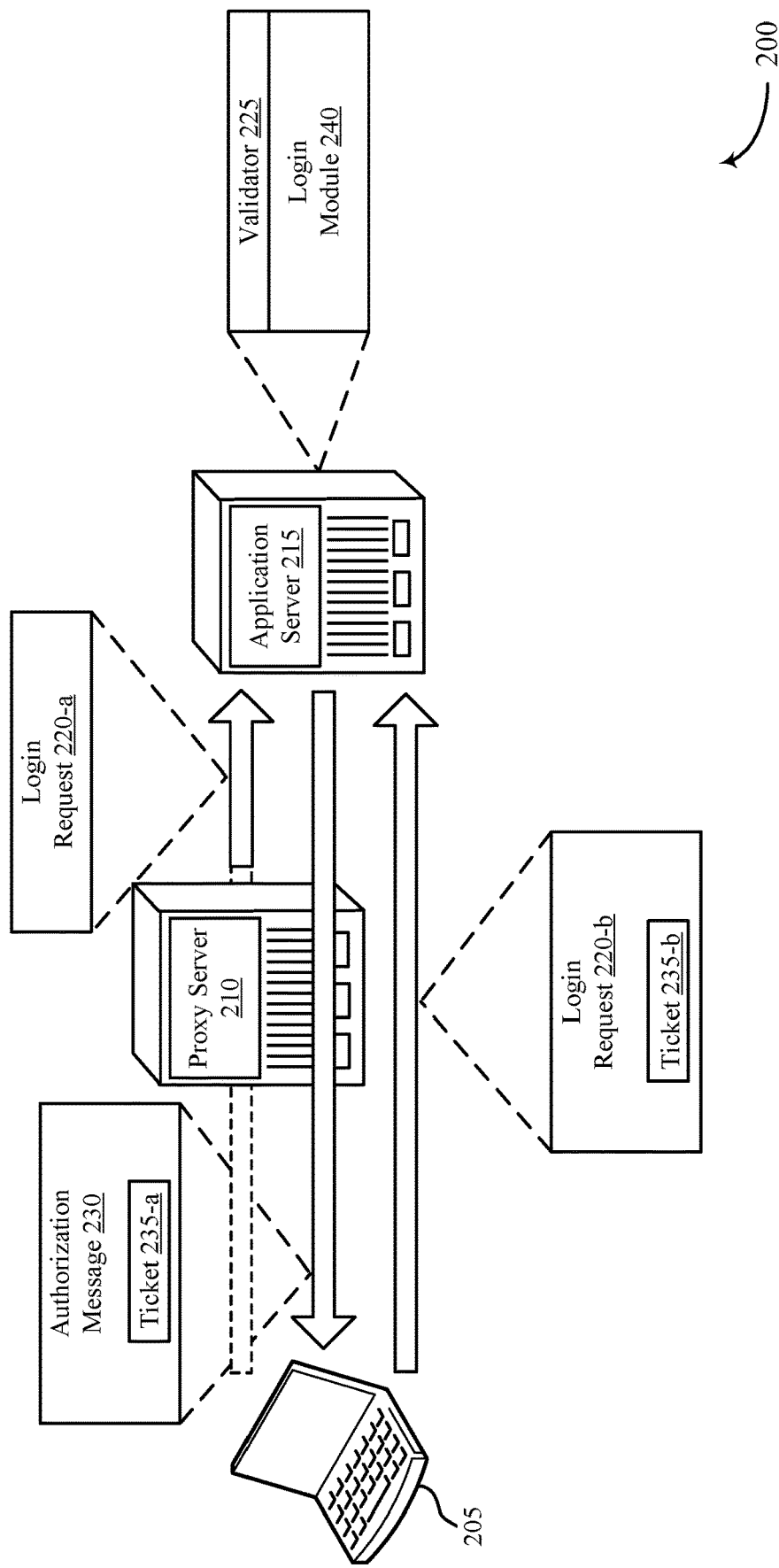
FIGS. 2 and 3 illustrate examples of systems that support user device authentication in accordance with aspects of the present disclosure.

FIG. 2 illustrates an example of a system 200 that supports user device authentication in accordance with various aspects of the present disclosure. The system 200 may include a user device 205, a proxy server 210, and an application server 215. The user device 205, the proxy server 210, and the application server 215 may be components of the subsystem 125, as described with reference to FIG. 1. For example, the user device 205 may be an example of a cloud client 105, while the proxy server 210 and the application server 215 may be components of the cloud platform 115. The proxy server 210 and the application server 215 may be examples of single servers or server clusters, or may be examples of software modules implemented within other devices. In some cases, the application server 215 may include one or more application platforms (e.g., a single sign-on (SSO) service, an identity provider platform, etc.).

The proxy server 210 may transmit a login request 220-a (e.g., a first login request) to the application server 215. In some cases, the user device 205 may initiate the process by transmitting a login request (e.g., the login request 220-a, or a similar login request including a portion of the information included in the login request 220-a) to the proxy server 210. In other cases, the user device 205 may transmit a login request to the application server 215, and the proxy server 210 may intercept the login request, perform one or more functions based on the login request (e.g., to verify the identity of the user device 205), and forward the login request 220-a to the application server 215 based on the functions. In this way, while the user device 205 may initiate the login procedure, the application server 215 may receive the login request 220-a from the proxy server 210, and may or may not identify that the user device 205 initiated the process.

In some examples, the login request 220-a may include a certificate associated with the user device 205. In other examples, the login request 220-a may include identification information (e.g., authentication information) associated with the proxy server 210. For example, the identification information may include an internet protocol (IP) address associated with the proxy server 210, a secret, an mTLS indication, or some combination of these. The login request 220-a may also include a request from the user device 205 to access the application server 215.

The application server 215 may receive the login request 220-a. In some cases, the application server 215 may include a validator 225. The validator 225 may be an example of server hardware components, software modules, or both for validating the user device 205 and the proxy server 210 based on the information associated with the login request 220-a. For example, the validator 225 may validate the proxy server 210 based on an IP address and a proxy server 210 specific secret. The validator 225 may also generate an authorization message 230 for transmission to the user device 205 if the login request 220-a indicates that the user device 205 is certified for access, and if the proxy server 210 is determined to be a valid proxy server 210. In some cases, the validator 225 may encrypt the authorization message 230 for transmission to the user device 205.

After the application server 215 validates the identity of the proxy server 210, the application server 215 may transmit the authorization message 230 to the user device 205. In some cases, if the validation passes, the authorization message 230 may include a ticket 235-a for user access. In some examples, the application server 215 may encrypt the ticket 235-a for increased security. As illustrated, the application server 215 may transmit the authorization message 230, via the proxy server 210, to the user device 205. However, the authorization message 230 may additionally or alternatively bypass the proxy server 210 during an authorization process.

In some cases, the user device 205 may transmit a login request 220-b (e.g., a second login request) to the application server 215. For example, the user device 205 may communicate with the application server 215 without routing the login request 220-b or any further messages through the proxy server 210, thereby allowing the user device 205 direct access to the application server 215. The login request 220-b may include a ticket 235-b. In some cases, the ticket 235-b may be the same as the ticket 235-a. The application server 215 may receive and identify the ticket, and may determine to process the login request 220-b from the user device 205 based on the ticket (e.g., as the ticket indicates that the user device 215 has previously been authenticated by the validator 225).

The application server 215 may receive the login request 220-b and may initiate a login procedure via the login module 240. For example, login module 240 may decrypt the login request 220-b, the ticket 235-b, or both to authenticate the user device 205 for access to an application platform within the application server 215. In some examples, initiating the login procedure may grant the user device 205 access to an application (e.g., without any further verification of user or user device 205 credentials). In other examples, initiating the login procedure may grant the user device 205 access to further security processes for the application, such as a login form to verify the credentials of a user operating the user device 205. In some cases, the user device 205 may communicate directly with the application server 215 (e.g., without interacting with the proxy server 210) once the user device 205 receives the ticket. For example, the proxy server 210 may initially act as a tunnel for the authentication procedure (e.g., transmitting the login request 220-a from the user device 205 to the application server 215). However, once the user device 205 receives the ticket 235-a, the user device 205 may bypass the proxy server 210 and communicate directly with the application server 215.

In some cases, by avoiding continuous tunneling through the proxy server 210, the user device 205 may not be obfuscated by the proxy server 210. That is, because the user device 205 may not tunnel further communications through the proxy server 210 following the initial authentication procedure, the application server 215 may receive messages directly from the user device 205 (i.e., not through a proxy), and may identify the user device 205 as the originator of the messages. For example, if the user device 205 were to continue to tunnel messages through the proxy server 210, the applications server 215 may identify messages received from the user device 205, but via the proxy server 210, as originating at the proxy server 210. This may result in inefficiencies or large overhead when attempting to determine the originating device for messages received at the application server 215.

Accordingly, by not tunneling all messaging through the proxy server 210, the application server 215 may enforce or manage profile Internet protocol (IP) restrictions for any service providers at a source service by identifying the IP address of the user device 205 as the message originator. Additionally or alternatively, user devices 205 and application platforms managed by the application server 215 may not trust the proxy server 210. In some examples, the proxy server 210 may not be included in a trusted IP range of the application platforms. The user device 205 may not send any user credentials (e.g., usernames, passwords, etc.) or application traffic through the proxy server 210. The proxy server 210 may be authorized to transmit the login request 220-a to the application server 215, but may be restricted from transmitting other messages (e.g., authorized messages accessing an application). Instead, once the user device 205 is authenticated, the application server 215 may receive the authentication request 220-b, user credentials, and any further authorized or authenticated messages directly from the user device 205.

In some cases, by not tunneling all communications through the proxy server 210, the system 200 may address an issue of scale. For example, in massive multi-tenant database systems (e.g., with thousands or millions of users across the multiple tenants), multiple messages may be sent between many user devices 205 and the application server 215. If all of the messages are tunneled through the proxy server 210, a large amount of latency may be introduced by this communication bottleneck. Alternatively, performing mTLS or a similar user device 205 validation procedure at every application server 215 may introduce a large amount of complexity and redundancy to the system. In either of these cases, application servers 210 within the multi-tenant database system may be used inefficiently if all the messages must be handled by proxy servers 210 or if all of the application servers 210 must handle certificate challenges for user devices 205. Therefore, because the user device 205 may initially use a proxy server 210, but then may communicate directly with the application server 215 following the initial authentication procedure, the latency may be reduced and the system 200 may utilize the servers efficiently.

Figure 3:
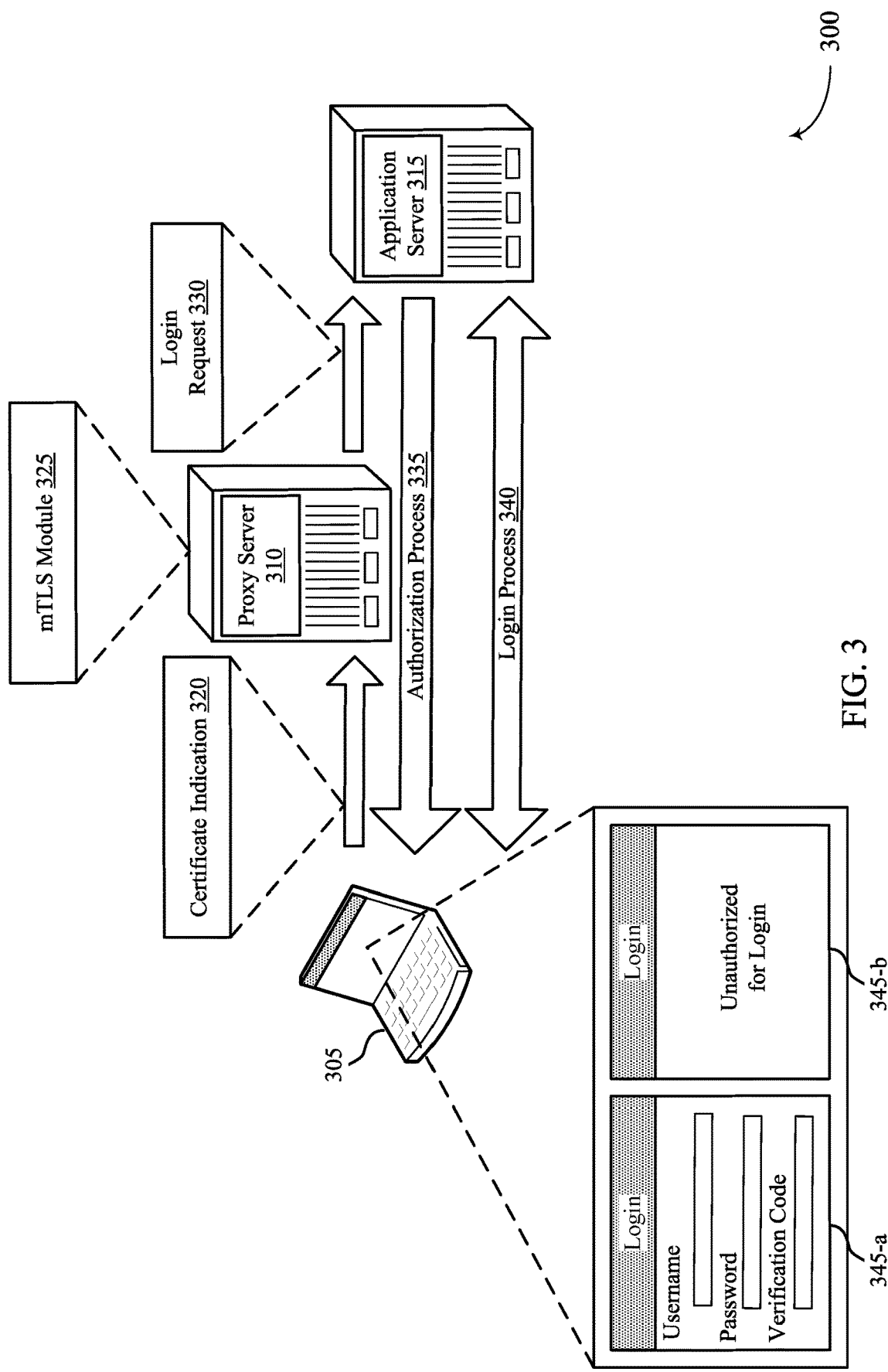

FIG. 3 illustrates an example of a system 300 that supports user device authentication in accordance with various aspects of the present disclosure. The system 300 may include a user device 305, proxy server 310, and application server 315, which may be examples of the corresponding devices described with respect to FIG. 2. In some cases, the proxy server 310 may be an example of a reverse proxy associated with the application server 315, where the proxy server 310 may intercept and handle messaging from any user devices 305 to the associated application server 315.

The user device 305 may transmit a certificate indication 320 to the proxy server 310. In some cases, the user device 305 may send the certificate indication 320 to the application server 315, and the proxy server 310 may intercept the certificate indication 320. The certificate indication 320 may include a certificate associated with the user device 305, along with a request for access to an application platform supported by the application server 315. The certificate may provide client-to-server transport layer security (TLS) for messages transmitted by the user device 305 (e.g., verifying the identity of the user device 305 to the application server 315). In some cases, the system 300 may additionally prove the identity of the application server 315 to the user device 305 using TLS. Some systems may leave authentication of the user device 305 to the application layer within the application server 315. However, such systems may introduce security risks by allowing user devices 305 access to the application layer before verifying whether the user devices 305 are authorized or not.

In some examples, the proxy server 310 may include one or more trusted root certificates stored in memory. For example, the application platform may include many certificates authorizing user devices 305 for access, where each of these certificates may share a common root. When initializing or setting up the proxy server 310 to perform a certificate challenge for the application platform, the proxy server 310 may receive an indication of the trusted root certificates for the application platform. In some cases, an owner of the application platform may update, rotate, or revoke the trusted root certificates for the proxy server 310 (e.g., automatically or based on a user input). In some examples, the certificates may be managed using an active directory as the certificate authority for user devices 305.

The proxy server 310 may receive the certificate indication 320 from the user device 305, and may determine a root for the indicated certificate. The proxy server 310 may identify whether the root for the indicated certificate matches or corresponds to a single trusted root certificate stored in memory of the proxy server 310. If the root matches a single trusted root certificate, the proxy server 310 may validate the certificate included in the certificate indication 320 based on this association. Accordingly, using trusted root certificates allows the proxy server 310 to verify whether the user device 305 contains a valid certificate without the proxy server 310 storing an exhaustive list of valid certificates or having direct access to a database associated with the certificates for the application platform. In some cases (e.g., for applications with few valid user device certificates), the proxy server 310 may store the list of verified certificates corresponding to user devices 305 authorized to access the application platform.

In some cases, the proxy server 310 may receive a request (e.g., an initial login request) from the user device 305 to access the application platform. The proxy server 310 may then perform an mTLS procedure based on the certificate indication 320 of the user device 305. For example, the proxy server 310 may include an mTLS module 325 that performs the mTLS procedure. The mTLS module 325 may identify that the request includes a verified certificate associated with the user device 305, and may indicate a successful mTLS procedure between the proxy server 310 and the user device 305 based on the verified certificate. In a first implementation, the proxy server 325 may send a login request 330 to the application server 315 based on the successful verification process. In a second implementation, the mTLS module 325 may indicate the successful result of the mTLS process in a message to the application server 315 (e.g., by tagging the information in a header of a login request 330 with an mTLS success tag).

In other examples, the mTLS module 325 may identify that the request includes an invalid certificate associated with the user device 305, or an absent certificate. Based on the invalid or absent certificate, the mTLS module 325 may determine an unsuccessful mTLS procedure between the proxy server 310 and the user device 305. In the first implementation described above, the proxy server 310 may send an indication to the user device 305 that the certificate indication 320 does not include a valid certificate, and may not send a login request 330 to the application server 315. In the second implementation described above, the proxy server 310 may include an indication of the failed mTLS process in a transmission to the application server 315 (e.g., by tagging the information in the header with an mTLS failure tag).

The proxy server 310 may transmit a login request 330 to the application server 315. The login request 330 may include the request (e.g., an SAML request), identifying information for the proxy server 310 (e.g., a unique identifier, such as a proxy or server specific secret), the result of the mTLS procedure (e.g., "success" if the user device 305 is authenticated at the proxy server 310 to access the application platform), or some combination of these parameters. The application server 315 may receive login request 330, and may determine whether the mTLS procedure was successful (e.g., based on receiving the login request 330, or based on the mTLS success tag). If the application server 315 determines that the mTLS procedure was unsuccessful, the application server 315 may transmit a message to the user device 305 indicating that the user device 305 is not authorized to access the application.

The application server 315 may further validate the proxy server 310 based on the received identifying information for the proxy server 310, such as a proxy server 310 specific secret. For example, the application server 315 may determine whether the proxy server 310 specific secret is a valid secret (e.g., according to a list of valid proxy servers 310 for the application server 315, and corresponding secrets). In some cases, the application server 315 may identify the proxy server 310 based on the secret and an IP address associated with the received login request 330. The application server 315 may verify that the secret matches a proxy server 310 associated with the application server 315, and that the IP address matches the same proxy server 310.

The secret may be proxy-specific secret associated with the proxy server 310. In some cases, the secret may be a static shared secret. For example, the secret may be a universally unique identifier shared between the proxy server 310 and the application server 315. In some cases, if the shared secret is exposed to an external network or user device 305, the content of the secret may not be duplicated due to a level of complexity associated with the universally unique identifier. The secret may be protected in transit by TLS encryption. In some cases, the secret may be stored at the application server 315 as protected metadata. For example, the secret may be stored in a managed packaged on the application platform. In other examples, the secret may be stored in a web server designed to deliver large amounts of static content (e.g., including the static shared secret). The web server may be an example of an nginx server. The shared secret may also be protected by the IP address associated with the proxy server 310. In some examples, each proxy server 310 may be identified by both an IP address and a shared secret.

The application server 315 may validate the identity of the proxy server 310 and may transmit a ticket (e.g., authorization message) as part of an authorization process 335 to the user device 305. As illustrated, authorization process 335 may bypass the proxy server 310. However, the proxy server 310 may additionally or alternatively facilitate the authorization process 335. In some cases, the application server 315 may receive the mTLS success tag, verify the proxy server 310, and send a valid ticket to the user device 305 as a result.

The ticket may authorize the user device 305 to communicate directly with the application server 315 (e.g., without any further interactions with the proxy server 310). For example, the ticket may serve as a token to present to the application platform within the application server 315. In some cases, the ticket may be an advanced encryption standard (AES) encrypted message that may include an IP address associated with the user device 305, the proxy server 310, or the application server 315, a timestamp associated with the time of the validation, or a combination of these parameters. In some cases, the ticket may be a dynamic shared secret between the application server 315 and the user device 305, where the application server 315 dynamically generates a secret for each authorization process 335. The application server 315 may contain one or more AES keys (e.g., encryption keys) for encrypting the tickets, and may utilize the same or corresponding AES keys for decrypting the tickets. In some examples, a managed package on the application platform may contain the one or more AES keys.

The user device 305 may receive the ticket, and may transmit a request (e.g., second authentication request) and the ticket via the login process 340 to the application server 315. In some cases (e.g., if the ticket is encrypted), the user device 305 may not be able to determine the information included in the ticket, as the user device 305 may not include an encryption key for decrypting the ticket. The user device 305 may transmit the request and the ticket directly to the application server 315, bypassing the proxy server 310. In some cases, the request may contain a same SAML request as sent in the certificate indication 320, the login request 330, or both. In response to receiving the request and the ticket, the application server 315 may begin the login process 340.

In some cases, in order to begin the login process 340, the application server 315 may validate that the user device 305 is authorized for the login process 340 based on the ticket. For example, in some cases, the ticket may be considered valid if the ticket is successfully decrypted by the application server 315 (e.g., using a corresponding AES key). In some examples, the ticket may be considered valid if the IP address in the ticket matches an expected IP address (e.g., an IP address of the application user device 305, proxy server 310, or application server 315). Additionally or alternatively, the ticket may be considered valid if the time stamp is within a certain time range (e.g., based on the current time and a pre-determined or dynamic time-to-live (TTL) value). For example, for a TTL value of three seconds, a ticket may be determined invalid if the timestamp of the ticket indicates a time younger than the current time when validating or receiving the ticket, or older than three seconds prior to the current time.

The login process 340 may include displaying a login form, such as a hypertext markup language (HTML) login form 345-*a* or an HTML login form 345-*b*, to the user device 305. For example, if the user device 305 is authenticated to access the application platform, the user device 305 may display login form 345-*a*. Login form 345-*a* may request user credentials (e.g., user identifiers) such as a username, password, verification code, or any combination of these or other user identification information. For example, login form 345-*a* may request a personal identification number (PIN) or a biometric input associated with the user of the user device 305. The user device 305 may than transmit the user credentials to the application server without exposing the user credentials to the proxy server 310. If the application server 315 determines that these user identifiers are valid for the login process 340 (e.g., based on an SSO service for an application platform), the application server 315 may grant the user access to the application platform.

In other examples, if the user device 305 is not authenticated to access the application platform, the user device 305 may display login form 345-*b*. Login form 345-*b* may present an 'unauthorized for login' message. Accordingly, the user device 305 may not access the application platform unless the user device 305 joins and logs in through a trusted virtual private network (VPN).

Figure 4:
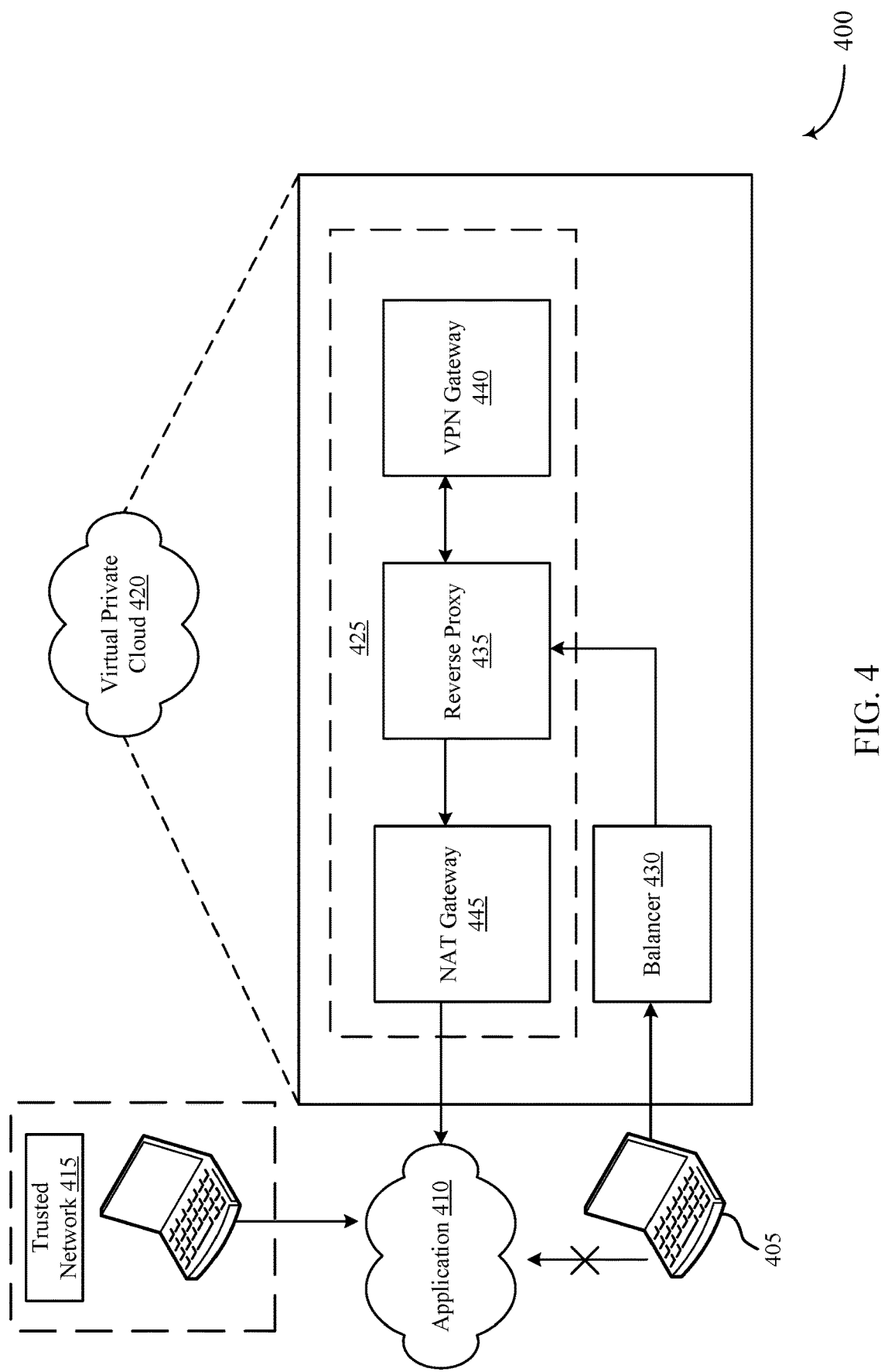
FIG. 4 illustrates an exemplary procedure that supports user device authentication in accordance with aspects of the present disclosure.

FIG. 4 illustrates an exemplary procedure 400 that supports user device authentication in accordance with various aspects of the present disclosure. A user device 405 may utilize the exemplary procedure 400 to authenticate the user device 405 for accessing an application 410 through virtual private cloud 420 when external to a trusted network 415. This user device 405 may be an example of a user device as described above, for example, with respect to FIGS. 2 and 3. The virtual private cloud 420 may receive access requests as input and may perform multiple procedures in order to authorize the user device 405.

In some cases, a trusted network 415 may be authorized to access application 410 without the use of the virtual private cloud 420. For a user device accessing the application 410 over the trusted network 415, the system may not need to perform an authentication process for the user device (e.g., as the trusted network 415 may already be authenticated). In other examples a user device 405 outside of the trusted network 415 may use virtual private cloud 420 to access the application 410. The virtual private cloud 420 may include an availability zone 425 and a balancer 430. The balancer 430 may be an example of an elastic load balancer, and the availability zone 425 may include a reverse proxy 435, a VPN gateway 440, a network address translation (NAT) gateway 445, or any combination of these components. In some cases, the virtual private cloud 420 may include one or more availability zones 425. The reverse proxy 435 may be an example of the corresponding proxy server described with respect to FIGS. 2 and 3.

In some cases, the user device 405 may transmit a request to access the application 410 to the availability zone 425 via the balancer 430. The reverse proxy 435 may receive the request and perform an mTLS procedure based on the certificate of the user device 405. If the result of the mTLS procedure is a success, the reverse proxy 435 may then transmit the request to the VPN gateway 440. For example, the VPN gateway 440 may extend a private network (e.g., the trusted network 415) across a public network to share information to a user device (e.g., the user device 405) in the public network. Therefore, the VPN gateway 440 may allow the user device 405 to function over a public network as if the user device 405 is connected with the trusted network 415.

The VPN gateway 440 may then transmit the request to the NAT gateway 445 via the reverse proxy 435. The NAT gateway 445 may enable the user device 405 to connect to web-related services (e.g., the Internet). In some cases, the NAT gateway 445 may allow private networks (e.g., the trusted network 415) to use an unregistered IP address to connect to the Internet. The NAT gateway 445 may then transmit the request to the application 410 to allow the user device access to the application 410. In some cases, the application 410 may include one or more identity provider platforms (e.g., SSO services).

Figure 5:
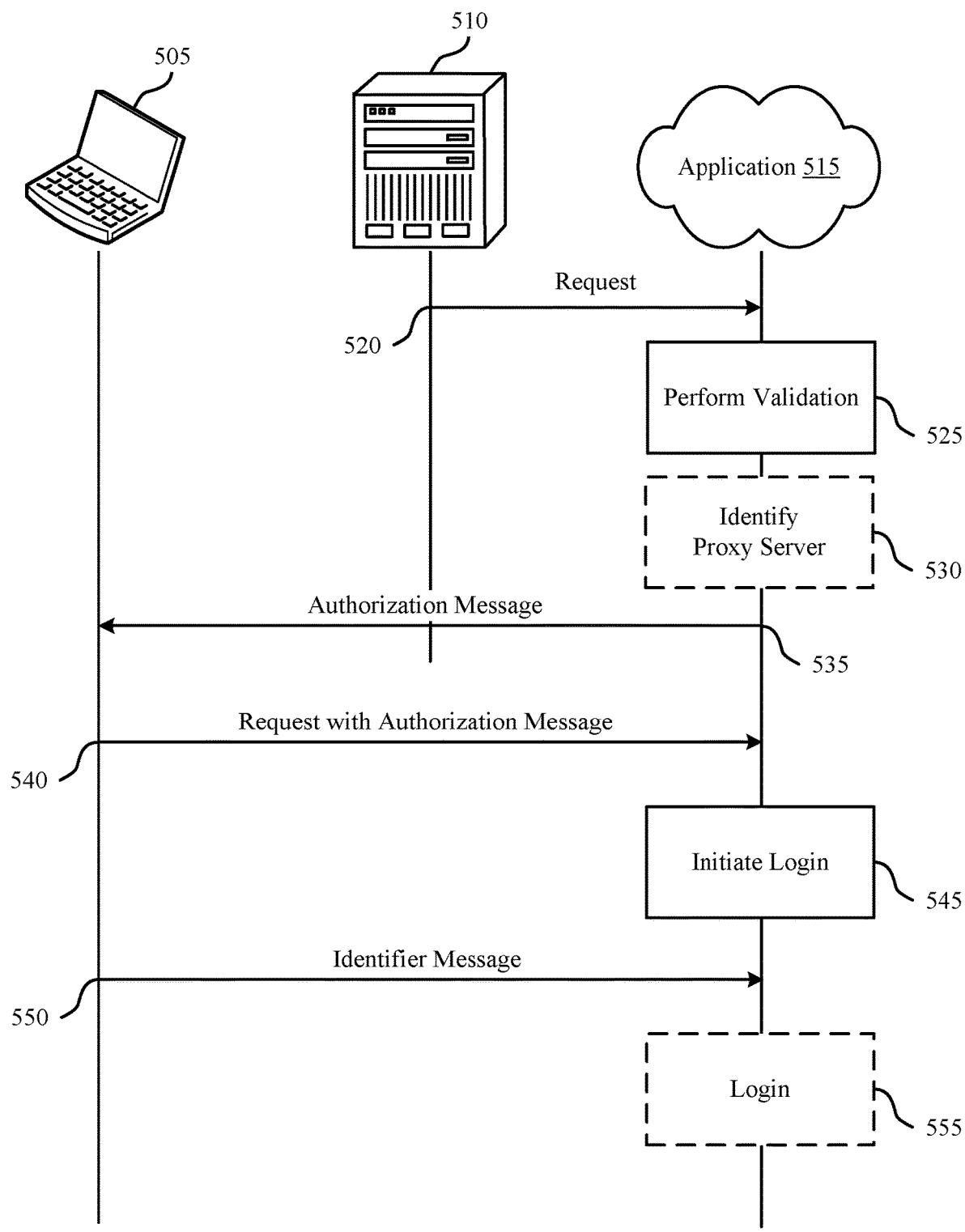
FIGS. 5 and 6 illustrate examples of process flows that support user device authentication in accordance with aspects of the present disclosure.

FIG. 5 illustrates an example process flow 500 that supports user device authentication in accordance with various aspects of the present disclosure. The process flow 500 may include a user device 505, a proxy server 510, and an application 515. The user device 505 and the proxy server 510 may be examples of the corresponding devices described with respect to FIGS. 2 through 4. The application 515 may be an example of the application 410 as described with respect to FIG. 4, and may be hosted by an application server described with respect to FIGS. 2 and 3. Alternative examples of the following may be implemented, where some steps are performed in a different order or not at all. Some steps may additionally include additional features not mentioned above.

The proxy server 510 may transmit the request 520 to the application 515. In some examples, the proxy server 510 may initially receive the request 520 or a similar request from the user device 505, and may transmit the request 520 to the application 515 based on this initial request from the user device 505. The request 520 may include a first login request and authentication information based on a certificate of the user device 505. The authentication information may include identification information for the proxy server 510 (e.g., a proxy server-specific secret). In some cases, the application 515 may initially receive the request 520 from the user device 505. For example, the request 520 may include an initial login request. The application 515 may identify that the initial login request does not include the authentication information or an authorization message. In these cases, the request 520 (e.g., the initial login request) may be redirected to the proxy server 510 based on the identifying.

In some cases, the request 520 may include an indication of a successful mTLS process between the proxy server 510 and the user device 505, where the successful mTLS process may be based on the certificate of the user device 505. In other cases, the request 520 may include an indication of an unsuccessful mTLS process between the proxy server 510 and the user device 505. For example, the unsuccessful mTLS process may be based on an invalid certificate (e.g., no certificate, a revoked certificate, an unverified certificate, etc.) of the user device 505.

At block 525, the application 515 may perform a validation process for the proxy server 510 based on the authentication information (e.g., the request 520). At block 530, the application 515 may identify the proxy server 510 as a valid proxy server (e.g., based on the proxy server-specific secret and an IP address associated with the proxy server 510).

The application 515 may transmit an authorization message 535 for use by the user device 505 based on a successful result of the validation process (e.g., based on receiving an indication of a successful mTLS process, identifying that the proxy server is a valid proxy, or both). In some cases, the authorization message 535 may be encrypted for transmission using an encryption key, and the authorization message received from the user device 505 may be decrypted using the encryption key. In some cases, the authorization message 535 may include an IP address and a timestamp. In some examples, the authorization message 535 may be relayed through the proxy server 510 to the user device 505. In other examples, the application 515 may transmit authorization message 535 directly to the user device 505. If the application 515 determines an unsuccessful result for the validation process, the authorization message 535 may include an indication that the user device 505 is not authorized for the login procedure based on an indication of an unsuccessful mTLS process or unsuccessful proxy server identification.

In some examples, the user device 505 may transmit a request with the authorization message 540 to the application 515. The request 540 may include a second login request and the authorization message. In some cases, the application 515 may receive the second login request and the authorization message directly from the user device 505 without routing data through the proxy server 510. In some cases, the second login request and the first login request may be examples of a same login request (e.g., a same SAML request).

At block 545, the application 515 may initiate login. For example, the application 515 may initiate a login procedure for the user device 505 based on receiving the second login request and the authorization message. In some cases, initiating the login may include validating the IP address and the timestamp associated with the authorization message. Initiating login may involve the application 515 sending a login form to the user device 505, and the user device 505 may display the login form to a user in a user interface.

The user device 505 may transmit identifier message 550 to the application 515. For example, the application 515 may receive, from the user device 505, one or more user identifiers for the login procedure (e.g., as user input entered into the login form). The one or more user identifiers may include a username, a password, a PIN, a biometric input, or a combination thereof. At block 555, the application 515 may login the user device 505 to access an application platform based on the one or more user identifiers. In some cases, the login allows the user device 505 to communicate with the application platform without routing data through the proxy server 510.

Figure 6:
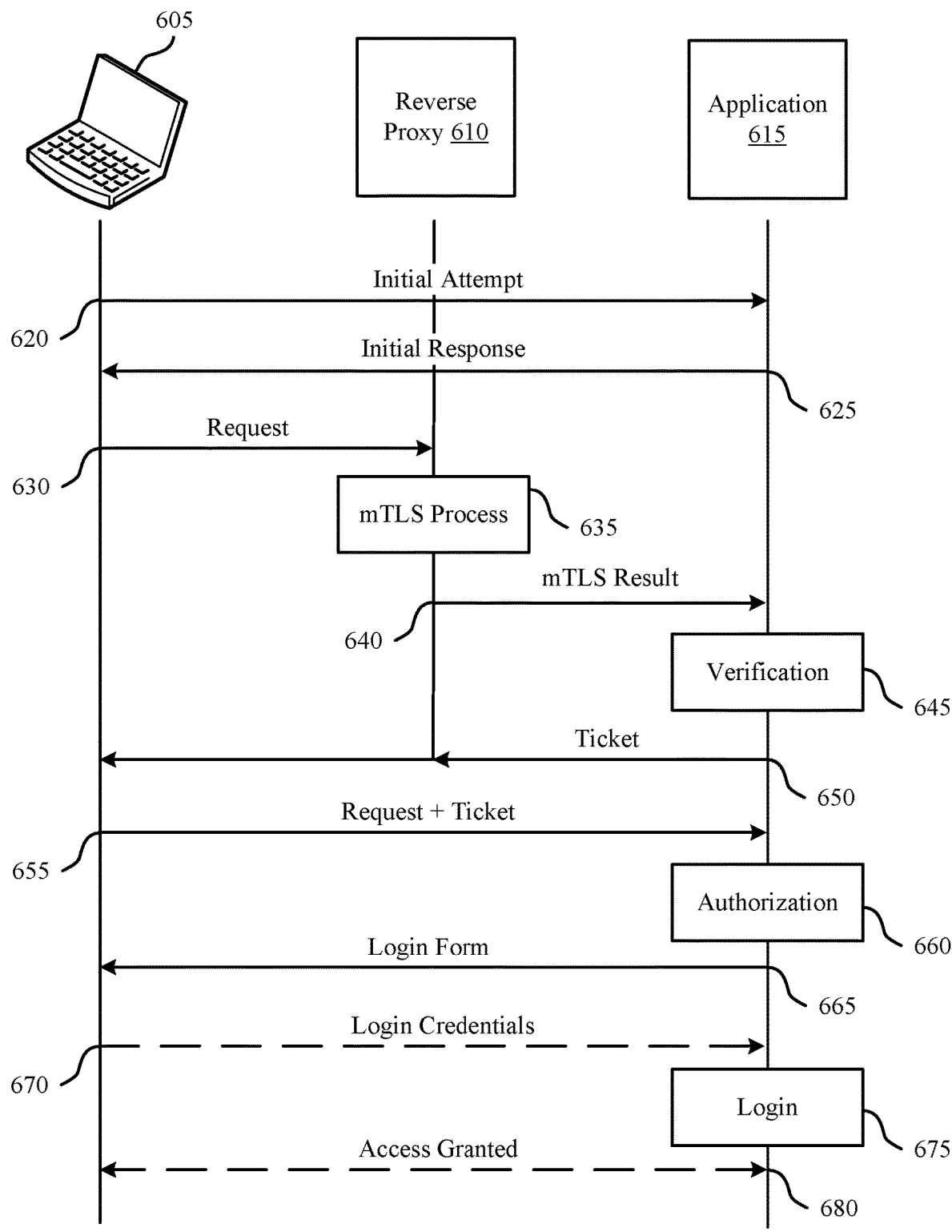

FIG. 6 illustrates an example of a process flow 600 that supports user device authentication in accordance with various aspects of the present disclosure. The process flow 600 may include a user device 605, a reverse proxy 610, and an application 615. The user device 605 may an example of the corresponding device described with respect to FIGS. 2 through 5. The reverse proxy 610 may be an example of the corresponding proxy server described with respect to FIGS. 2 through 5. The application 615 may be an example of or hosted by an application or application server as described with respect to FIGS. 2 through 5. Alternative examples of the following may be implemented, where some steps are performed in a different order or not at all. Some steps may additionally include additional features not mentioned above.

In some examples, the user device 605 may transmit an initial attempt 620 to the application 615. For example, the initial attempt 620 may include an initial login request to access the application platform associated with the application 615. In some cases, the initial attempt 620 may include an SAML request and a relay state. The initial attempt 620 may bypass the reverse proxy 610.

In some cases, the application 615 may determine that the user device 605 is not logged in to access the application 615. Additionally or alternatively, the application 615 may identify that the initial attempt 620 does not include an encrypted message (e.g., authorization message), a secret, or mTLS success or failure indication (e.g., authentication information). Therefore, the application 615 may perform a post binding procedure and transmit an initial response 625 back to the user device 605. The initial response 625 may include the SAML request and the relay state included in the initial attempt 620. In some cases, the user device 605 may transmit two initial attempts, a first to an application platform (e.g., where the application platform determines that the user device 605 has not logged in), and a second to a login service for the application platform (e.g., where the login service determines that the user device 605 is not yet authorized to receive a login form).

In some examples, a request 630 may be directed to the reverse proxy 610. That is, the initial attempt 620 to access the application platform may be redirected to the reverse proxy 610 based on identifying that the initial attempt 620 did not include the authentication information (e.g., if the user device 605 attempts to access the application 615 from an external network, as opposed to a trusted network). Request 630 may also include the SAML request and the relay state.

At block 635, the reverse proxy 610 may initiate an mTLS process. The mTLS process may be based on a certificate associated with the user device 605 to validate the identity of the user device 605. The reverse proxy 610 may then transmit an mTLS result 640 to the application 615. In some examples, the mTLS result 640 may include a header, the SAML request, and the relay state. For example, the header may include a successful mTLS process tag and a reverse proxy-specific secret. The secret may include a universally unique identifier.

However, in some cases, the header may include an unsuccessful mTLS process tag or an invalid secret. The unsuccessful mTLS process tag may be based on the certificate associated with the user device 605. For example, the certificate may be revoked, expired, or absent. Additionally or alternatively, the secret may be corrupted during transmission to the application 615, or the reverse proxy 610 may not serve the application 615. In these cases, the reverse proxy 610 may still transmit a header (e.g., including the successful mTLS process tag if the certificate is valid), the SAML request, and the relay state to application 615. Because the application 615 may not be able to identify the received secret (e.g., due to corruption, interference, or an invalid reverse proxy 610), the application 615 may determine that the user device 605 is unauthorized to access the application platform.

In these cases, the application 615 may then transmit the SAML request, relay state, and no proxy message to the user device 605. The user device 605 may relay the SAML request, relay state, and no proxy message to the application 615, and receive in return an indication that the user device 605 is unauthorized to access the application platform. For example, the user device 605 may not receive an HTML login form, but rather the user device 605 may receive an indication that a VPN is required. In order to access the HTML login form, the user device 605 may join a valid VPN or trusted network. That is, the authentication process may stop an unauthorized user from viewing the HTML login form, which may prevent the unauthorized user from accessing the application platform through alternative ways (e.g., obtaining login credentials illegally, guessing the login credentials, etc.)

At block 645, the application 615 may perform verification for the user device 605 to access the application platform associated with the application 615. The verification may be based on information included in the header (e.g., the secret and the mTLS process tag). For example, if the header includes a successful mTLS process tag, the user device 605 may be authorized to access the application platform. Alternatively, if the header includes an unsuccessful mTLS process tag, the user device 605 may be unauthorized to access the application platform. In some cases, the application 615 may identify the reverse proxy 610 based on the reverse proxy-specific secret and an IP address associated with the reverse proxy 610. In these cases, the application 615 may verify that the user device 605 is authorized to access the application platform or a corresponding login procedure if the reverse proxy-specific secret and the IP address correspond to a same reverse proxy 610 associated with the application 615.

After the user device 605 is verified to access the application platform based on a successful mTLS process tag, the application 615 may transmit a ticket 650 to the user device 605. The ticket 650 may be an example of an encrypted message and may also include the SAML request and the relay state. In some cases, the ticket 650 may include an IP address and a timestamp associated with the time of the verification. The ticket 650 may enable the user device 605 to login directly with the application 615 (e.g., without further interactions with the reverse proxy 610).

The ticket 650 may be transmitted to the user device 605 via the reverse proxy 610. That is, the reverse proxy 610 may forward the ticket, the SAML request, and the relay state to the user device 605. In other examples, the ticket 650 may be transmitted directly to the user device 605 (e.g., bypassing the reverse proxy 610). The ticket may authorize the user device 605 to send messages directly to the application 615 (e.g., after the initial certificate challenge performed by the reverse proxy 610).

In some examples, the user device 605 may transmit a request and ticket 655 to the application 615. The request and the ticket 655 may include the SAML request, the relay state, and the ticket. At block 660, the application 615 may authorize the user device to access the application platform or the login service for the application platform. For example, the application 615 may decrypt and validate the ticket (e.g., the IP address and the time stamp).

The application 615 may transmit login form 665 to the user device 605. For example, an HTML login form may be displayed at the user device 605. In some cases, the user device 605 may transmit login credentials 670 (e.g., user identifiers) to the application 615. These login credentials 670 may be input by a user operating user device 605. The reverse proxy may not interact with (e.g., receive, store, or handle in any way) the login credentials 670 associated with the user device 605. In some cases, the login credentials 670 may include a username, a password, and a multi-factor (e.g., two-factor) authentication indication.

At block 675, the application 615 may login the user device 605 to access the application platform (e.g., based on verifying that the received login credentials 670 correspond to a valid user). The application 615 may then grant access 680 to the user device. In some examples, granting access 680 may involve the application 615 transmitting an SAML response and the relay state to the user device 605.

Figure 7:
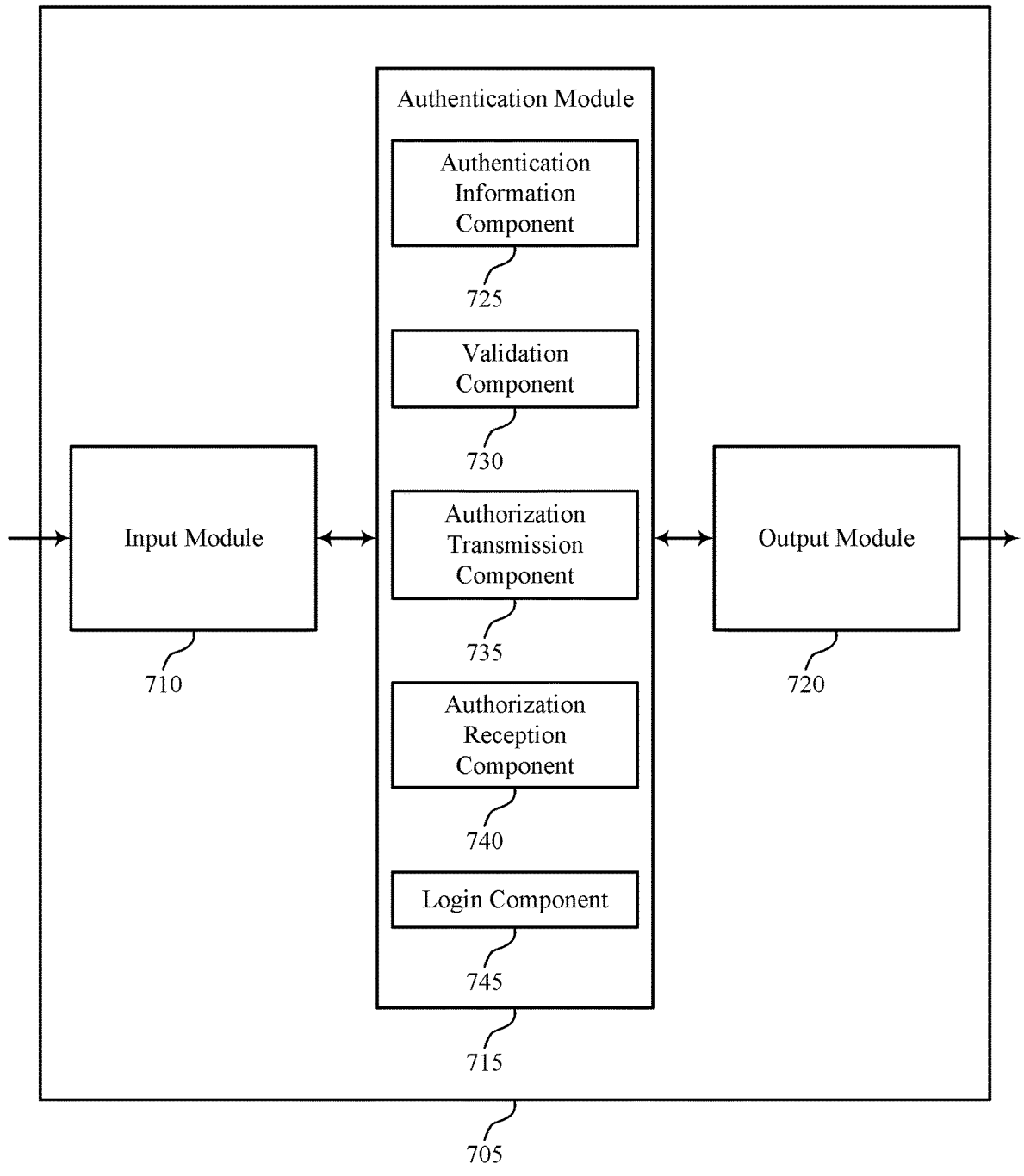
FIGS. 7 and 8 show block diagrams of a device that supports user device authentication in accordance with aspects of the present disclosure.

FIG. 7 shows a block diagram 700 of an apparatus 705 that supports user device authentication in accordance with aspects of the present disclosure. Apparatus 705 may include input module 710, authentication module 715, and output module 720. Apparatus 705 may also include a processor. Each of these components may be in communication with one another (e.g., via one or more buses). In some cases, apparatus 705 may be an example of a user terminal, a database server, or a system containing multiple computing devices.

Authentication module 715 may be an example of aspects of the authentication module 815 or 915 described with reference to FIGS. 8 and 9. Authentication module 715 may also include authentication information component 725, validation component 730, authorization transmission component 735, authorization reception component 740, and login component 745.

Authentication module 715 and/or at least some of its various sub-components may be implemented in hardware, software executed by a processor, firmware, or any combination thereof. If implemented in software executed by a processor, the functions of the authentication module 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The authentication module 715 and/or at least some of its various sub-components may be physically located at various positions, including being distributed such that portions of functions are implemented at different physical locations by one or more physical devices. In some examples, authentication module 715 and/or at least some of its various sub-components may be a separate and distinct component in accordance with various aspects of the present disclosure. In other examples, authentication module 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Authentication information component 725 may receive, from a proxy server, a first login request and authentication information based on a certificate of a user device, where the authentication information includes identification information for the proxy server. Validation component 730 may perform a validation process for the proxy server based on the authentication information.

Authorization transmission component 735 may transmit an authorization message for use by the user device based on a successful result of the validation process. Authorization reception component 740 may receive, from the user device, a second login request and the authorization message. Login component 745 may initiate a login procedure for the user device based on receiving the second login request and the authorization message.

Figure 8:
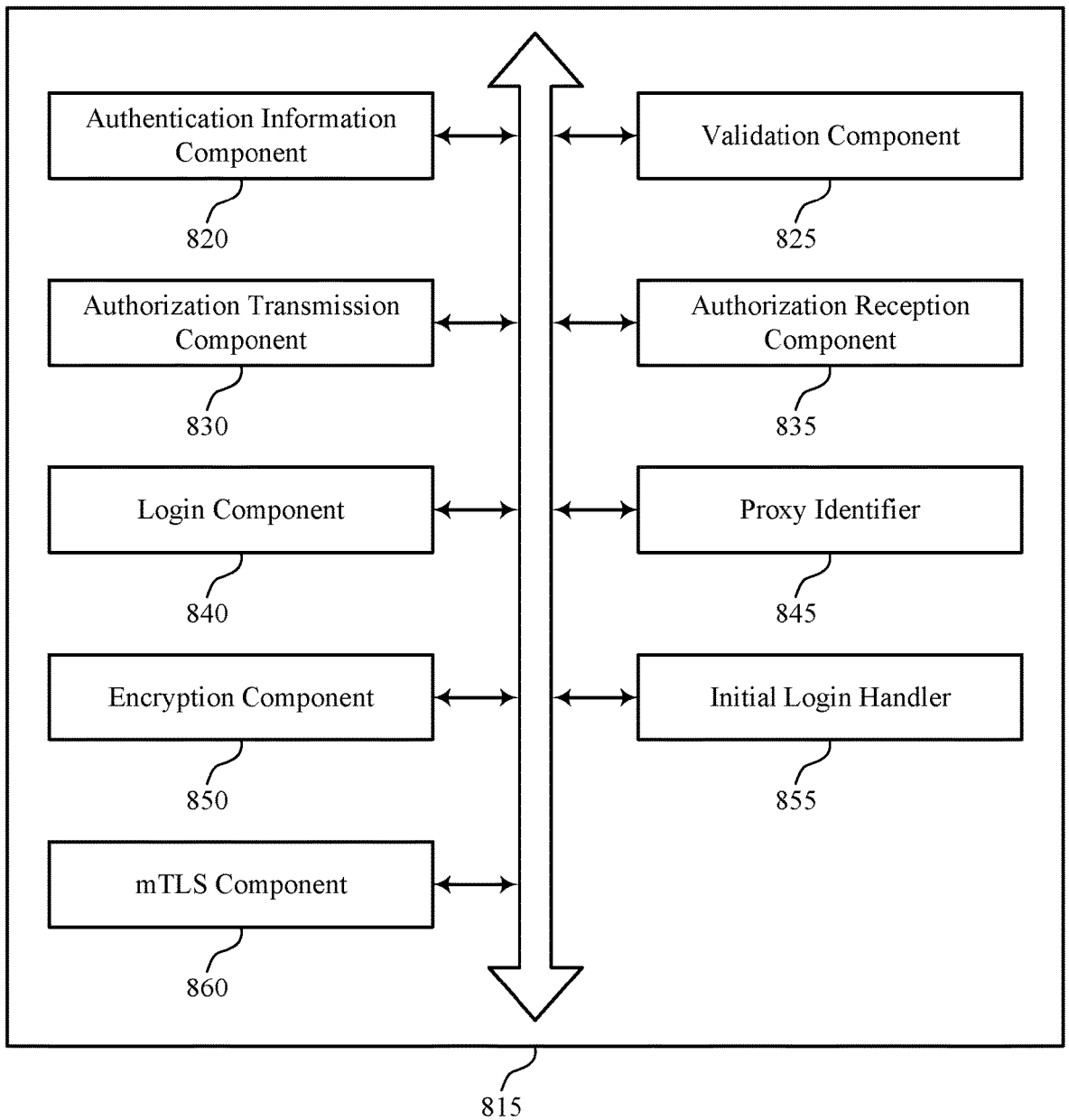

FIG. 8 shows a block diagram 800 of an authentication module 815 that supports user device authentication in accordance with aspects of the present disclosure. The authentication module 815 may be an example of aspects of an authentication module 715 or 915 described with reference to FIGS. 7 and 9. The authentication module 815 may include authentication information component 820, validation component 825, authorization transmission component 830, authorization reception component 835, login component 840, proxy identifier 845, encryption component 850, initial login handler 855, and mTLS component 860. Each of these modules may communicate, directly or indirectly, with one another (e.g., via one or more buses).

Authentication information component 820 may receive, from a proxy server, a first login request and authentication information based on a certificate of a user device, where the authentication information includes identification information for the proxy server.

Validation component 825 may perform a validation process for the proxy server based on the authentication information.

Authorization transmission component 830 may transmit an authorization message for use by the user device based on a successful result of the validation process. In some cases, transmitting the authorization message for use by the user device includes relaying the authorization message through the proxy server to the user device. In some cases, the authorization message includes an IP address and a timestamp, where initiating a login procedure includes validating the IP address and the timestamp when receiving the authorization message back from the user device.

Authorization reception component 835 may receive, from the user device, a second login request and the authorization message. In some cases, receiving the second login request and the authorization message includes receiving the second login request and the authorization message directly from the user device without routing data through the proxy server.

Login component 840 may initiate a login procedure for the user device based on receiving the second login request and the authorization message. In some cases, the login procedure includes receiving, from the user device, one or more user identifiers for the login procedure. In some cases, login component 840 may authenticate the user device for access to an application platform based on the one or more user identifiers. In some cases, the authenticating allows the user device to communicate with the application platform without routing data through the proxy server. In some cases, the one or more user identifiers include a username, a password, a PIN, a biometric input, or a combination thereof.

In some cases, the authentication information may include a proxy server-specific secret, where performing the validation process for the proxy server may include proxy identifier 845 identifying the proxy server based on the proxy server-specific secret and an IP address associated with the proxy server.

Encryption component 850 may encrypt the authorization message for transmission using an encryption key, and may decrypt the authorization message received from the user device using the encryption key.

Initial login handler 855 may receive, from the user device, an initial login request, identify that the initial login request does not include the authentication information or the authorization message, and redirect the initial login request to the proxy server based on the identifying, where receiving, from the proxy server, the first login request and the authentication information is based on the redirecting.

In some cases, the authentication information includes an indication of a successful mTLS process between the proxy server and the user device, where the successful mTLS process based on the certificate of the user device. In other cases, mTLS component 860 may receive, from the proxy server, an additional login request and an additional indication of an unsuccessful mTLS process between the proxy server and an additional user device, the unsuccessful mTLS process based on an invalid certificate of the additional user device, and mTLS component 860 may transmit a message indicating that the additional user device is not authorized for the login procedure based on the additional indication of the unsuccessful mTLS process.

Figure 9:
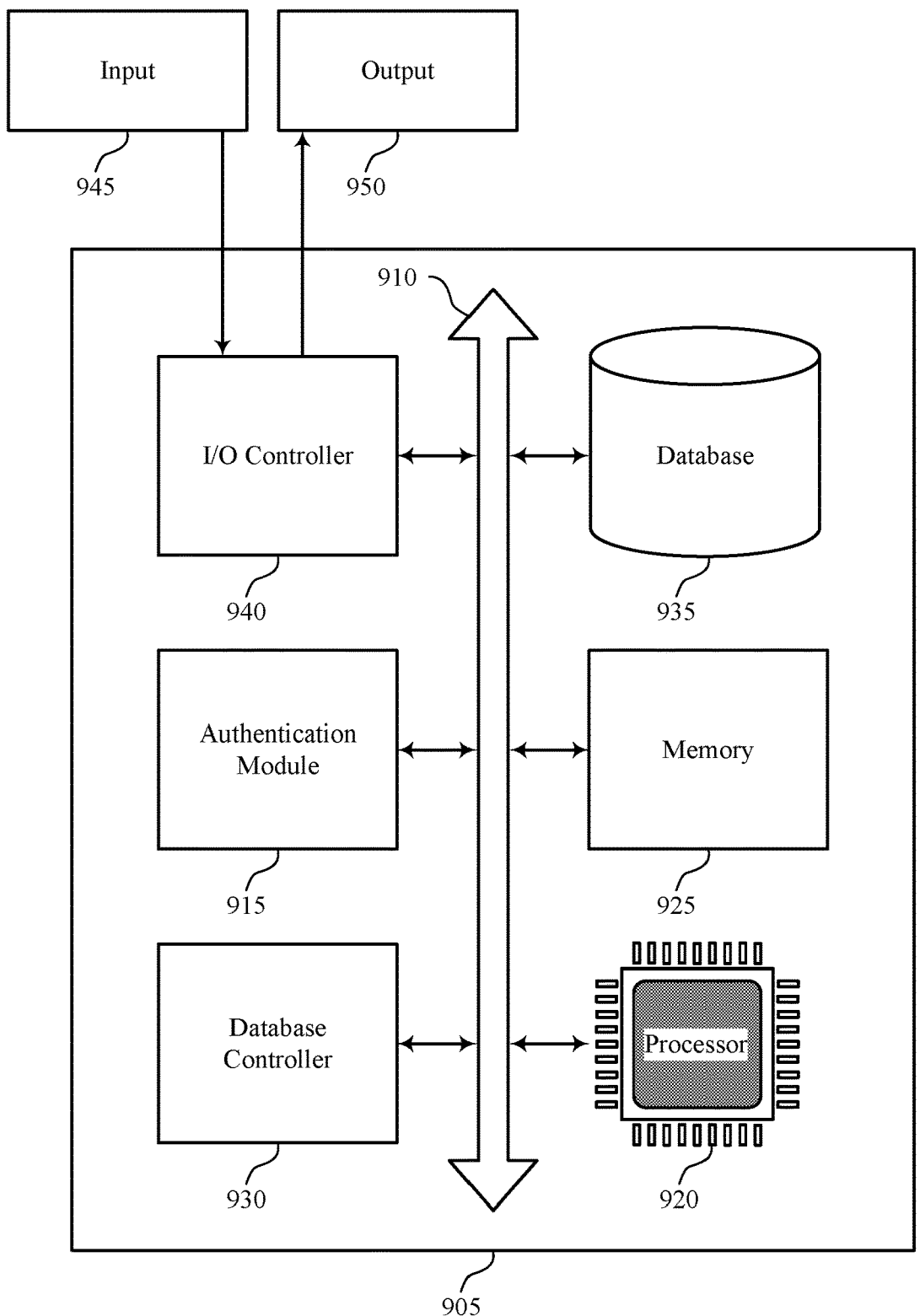
FIG. 9 illustrates a block diagram of a system including an application server that supports user device authentication in accordance with aspects of the present disclosure.

FIG. 9 shows a diagram of a system 900 including a device 905 that supports user device authentication in accordance with aspects of the present disclosure. Device 905 may be an example of or include the components of an application or an application server as described above, e.g., with reference to FIGS. 2 through 6. Device 905 may include components for bi-directional data communications including components for transmitting and receiving communications, including authentication module 915, processor 920, memory 925, database controller 930, database 935, and I/O controller 940. These components may be in electronic communication via one or more buses (e.g., bus 910).

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting user device authentication).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Database controller 930 may manage data storage and processing in database 935. In some cases, a user may interact with database controller 930. In other cases, database controller 930 may operate automatically without user interaction. Database 935 may be an example of a single database, a distributed database, multiple distributed databases, or an emergency backup database.

I/O controller 940 may manage input and output signals for device 905. I/O controller 940 may also manage peripherals not integrated into device 905. In some cases, I/O controller 940 may represent a physical connection or port to an external peripheral. In some cases, I/O controller 940 may utilize an operating system such as iOS®, ANDROID®, MS-DOS®, MS-WINDOWS®, OS/2®, UNIX®, LINUX®, or another known operating system. In other cases, I/O controller 940 may represent or interact with a modem, a keyboard, a mouse, a touchscreen, or a similar device. In some cases, I/O controller 940 may be implemented as part of a processor. In some cases, a user may interact with device 905 via I/O controller 940 or via hardware components controlled by I/O controller 940.

Figure 10:
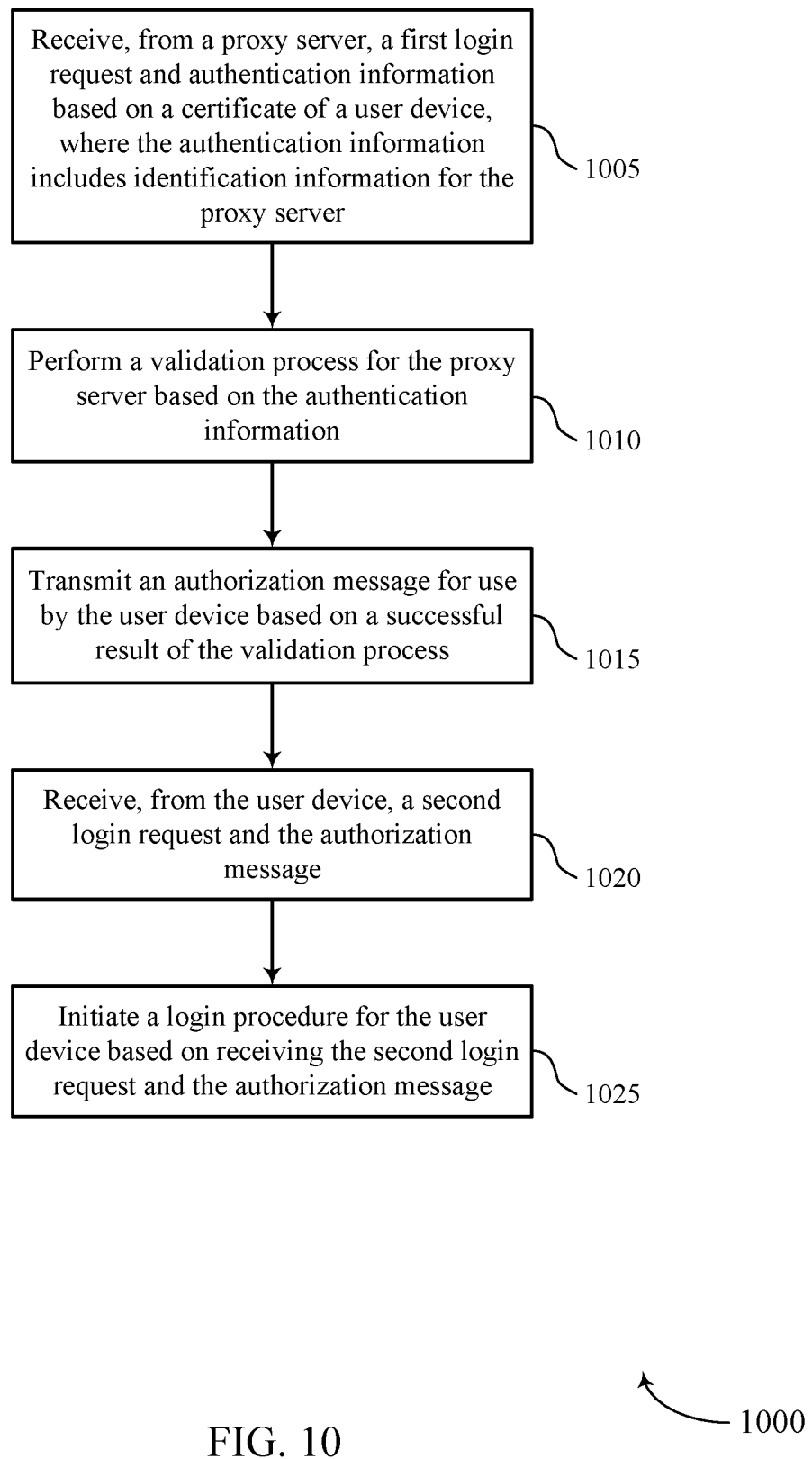
FIGS. 10 through 12 illustrate methods for user device authentication in accordance with aspects of the present disclosure.

FIG. 10 shows a flowchart illustrating a method 1000 for user device authentication in accordance with aspects of the present disclosure. The operations of method 1000 may be implemented by an application server or its components as described herein. For example, the operations of method 1000 may be performed by an authentication module as described with reference to FIGS. 7 through 9. In some examples, an application server may execute a set of codes to control the functional elements of the device to perform the functions described below. Additionally or alternatively, the application server may perform aspects of the functions described below using special-purpose hardware.

At 1005 the application server may receive, from a proxy server, a first login request and authentication information based at least in part on a certificate of a user device, wherein the authentication information comprises identification information for the proxy server. The operations of 1005 may be performed according to the methods described herein. In certain examples, aspects of the operations of 1005 may be performed by an authentication information component as described with reference to FIGS. 7 through 9.

At 1010 the application server may perform a validation process for the proxy server based at least in part on the authentication information. The operations of 1010 may be performed according to the methods described herein. In certain examples, aspects of the operations of 1010 may be performed by a validation component as described with reference to FIGS. 7 through 9.

At 1015 the application server may transmit an authorization message for use by the user device based at least in part on a successful result of the validation process. The operations of 1015 may be performed according to the methods described herein. In certain examples, aspects of the operations of 1015 may be performed by an authorization transmission component as described with reference to FIGS. 7 through 9.

At 1020 the application server may receive, from the user device, a second login request and the authorization message. The operations of 1020 may be performed according to the methods described herein. In certain examples, aspects of the operations of 1020 may be performed by an authorization reception component as described with reference to FIGS. 7 through 9.

At 1025 the application server may initiate a login procedure for the user device based at least in part on receiving the second login request and the authorization message. The operations of 1025 may be performed according to the methods described herein. In certain examples, aspects of the operations of 1025 may be performed by a login component as described with reference to FIGS. 7 through 9.

Figure 11:
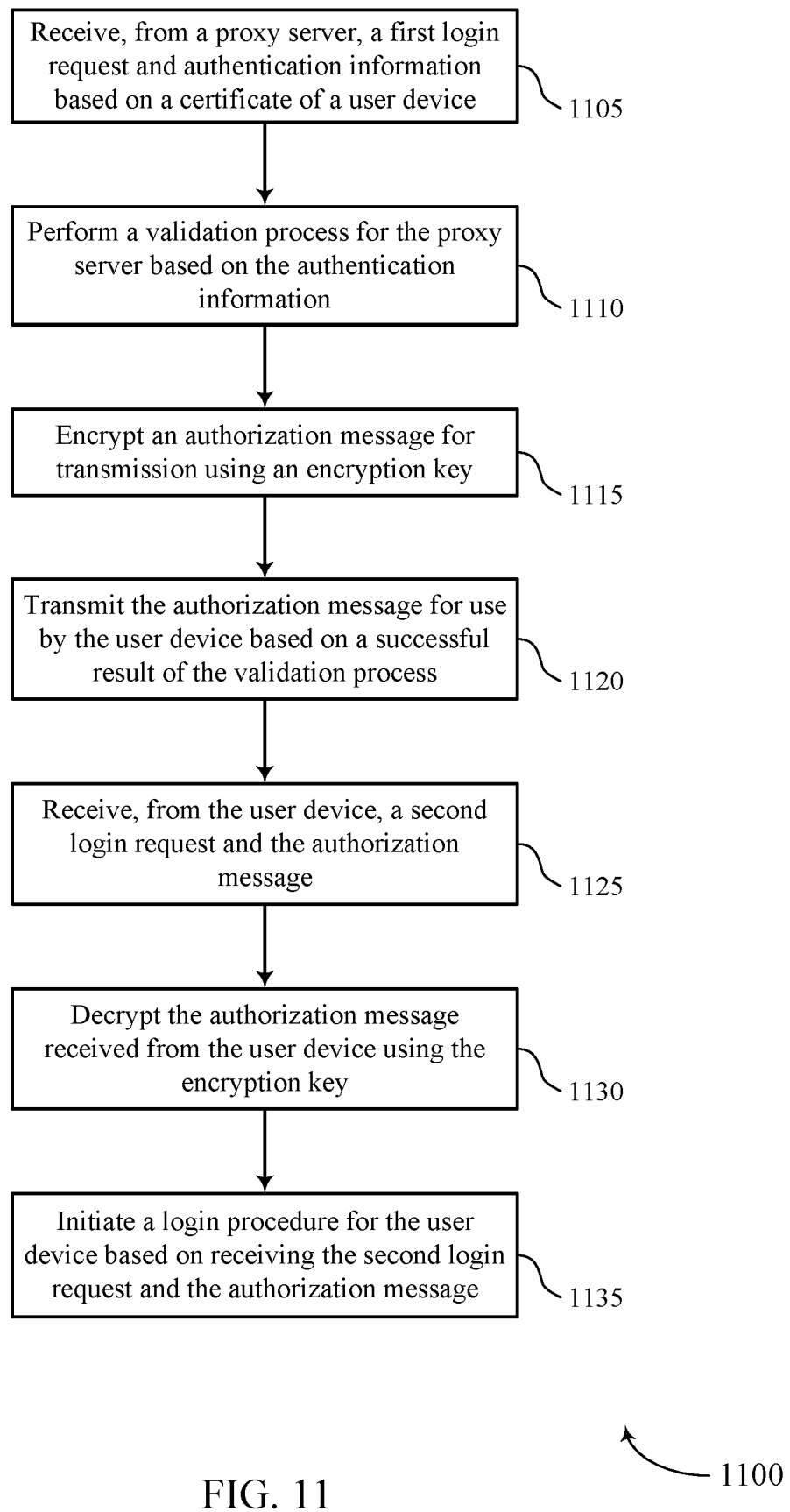

FIG. 11 shows a flowchart illustrating a method 1100 for user device authentication in accordance with aspects of the present disclosure. The operations of method 1100 may be implemented by an application server or its components as described herein. For example, the operations of method 1100 may be performed by an authentication module as described with reference to FIGS. 7 through 9. In some examples, an application server may execute a set of codes to control the functional elements of the device to perform the functions described below. Additionally or alternatively, the application server may perform aspects of the functions described below using special-purpose hardware.

At 1105 the application server may receive, from a proxy server, a first login request and authentication information based at least in part on a certificate of a user device, wherein the authentication information comprises identification information for the proxy server. The operations of 1105 may be performed according to the methods described herein. In certain examples, aspects of the operations of 1105 may be performed by an authentication information component as described with reference to FIGS. 7 through 9.

At 1110 the application server may perform a validation process for the proxy server based at least in part on the authentication information. The operations of 1110 may be performed according to the methods described herein. In certain examples, aspects of the operations of 1110 may be performed by a validation component as described with reference to FIGS. 7 through 9.

At 1115 the application server may encrypt an authorization message for transmission using an encryption key. The operations of 1115 may be performed according to the methods described herein. In certain examples, aspects of the operations of 1115 may be performed by an encryption component as described with reference to FIGS. 7 through 9.

At 1120 the application server may transmit the encrypted authorization message for use by the user device based at least in part on a successful result of the validation process. The operations of 1120 may be performed according to the methods described herein. In certain examples, aspects of the operations of 1120 may be performed by an authorization transmission component as described with reference to FIGS. 7 through 9.

At 1125 the application server may receive, from the user device, a second login request and the encrypted authorization message. The operations of 1125 may be performed according to the methods described herein. In certain examples, aspects of the operations of 1125 may be performed by an authorization reception component as described with reference to FIGS. 7 through 9.

At 1130 the application server may decrypt the authorization message received from the user device using the encryption key. The operations of 1130 may be performed according to the methods described herein. In certain examples, aspects of the operations of 1130 may be performed by an encryption component as described with reference to FIGS. 7 through 9.

At 1135 the application server may initiate a login procedure for the user device based at least in part on receiving the second login request and the authorization message. The operations of 1135 may be performed according to the methods described herein. In certain examples, aspects of the operations of 1135 may be performed by a login component as described with reference to FIGS. 7 through 9.

Figure 12:
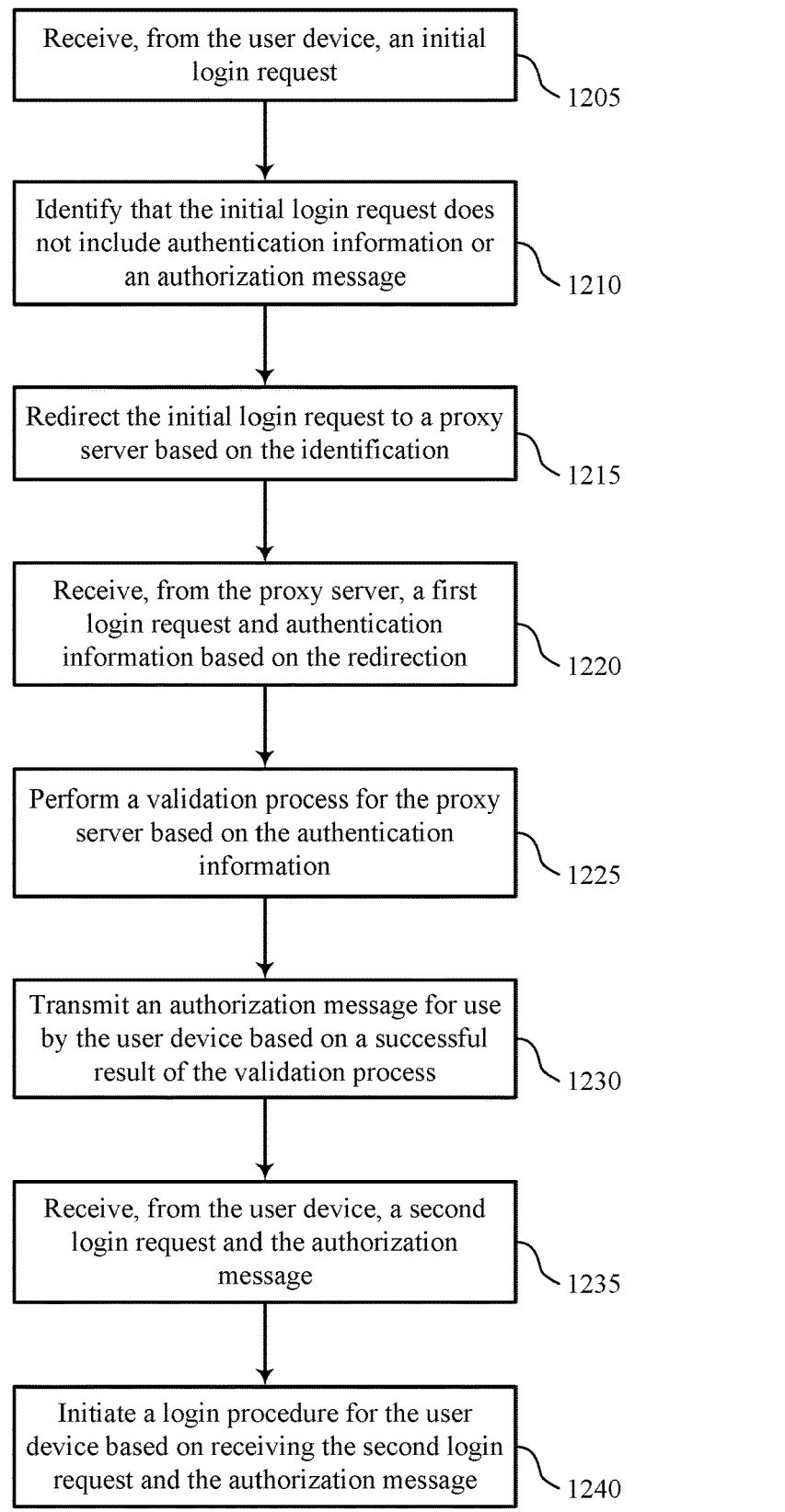

FIG. 12 shows a flowchart illustrating a method 1200 for user device authentication in accordance with aspects of the present disclosure. The operations of method 1200 may be implemented by an application server or its components as described herein. For example, the operations of method 1200 may be performed by an authentication module as described with reference to FIGS. 7 through 9. In some examples, an application server may execute a set of codes to control the functional elements of the device to perform the functions described below. Additionally or alternatively, the application server may perform aspects of the functions described below using special-purpose hardware.

At 1205 the application server may receive, from the user device, an initial login request. The operations of 1205 may be performed according to the methods described herein. In certain examples, aspects of the operations of 1205 may be performed by an initial login handler as described with reference to FIGS. 7 through 9.

At 1210 the application server may identify that the initial login request does not include authentication information or an authorization message. The operations of 1210 may be performed according to the methods described herein. In certain examples, aspects of the operations of 1210 may be performed by an initial login handler as described with reference to FIGS. 7 through 9.

At 1215 the application server may redirect the initial login request to a proxy server based at least in part on the identifying. The operations of 1215 may be performed according to the methods described herein. In certain examples, aspects of the operations of 1215 may be performed by an initial login handler as described with reference to FIGS. 7 through 9.

At 1220 the application server may receive, from the proxy server, a first login request and authentication information based at least in part on a certificate of a user device, wherein the authentication information comprises identification information for the proxy server. The application server may receive the first login request and the authentication information the proxy server based at least in part on the redirecting. The operations of 1220 may be performed according to the methods described herein. In certain examples, aspects of the operations of 1220 may be performed by an authentication information component as described with reference to FIGS. 7 through 9.

At 1225 the application server may perform a validation process for the proxy server based at least in part on the authentication information. The operations of 1225 may be performed according to the methods described herein. In certain examples, aspects of the operations of 1225 may be performed by a validation component as described with reference to FIGS. 7 through 9.

At 1230 the application server may transmit an authorization message for use by the user device based at least in part on a successful result of the validation process. The operations of 1230 may be performed according to the methods described herein. In certain examples, aspects of the operations of 1230 may be performed by an authorization transmission component as described with reference to FIGS. 7 through 9.

At 1235 the application server may receive, from the user device, a second login request and the authorization message. The operations of 1235 may be performed according to the methods described herein. In certain examples, aspects of the operations of 1235 may be performed by an authorization reception component as described with reference to FIGS. 7 through 9.

At 1240 the application server may initiate a login procedure for the user device based at least in part on receiving the second login request and the authorization message. The operations of 1240 may be performed according to the methods described herein. In certain examples, aspects of the operations of 1240 may be performed by a login component as described with reference to FIGS. 7 through 9.

A method of user device authentication is described. The method may include receiving, from a proxy server, a first login request and authentication information based at least in part on a certificate of a user device, wherein the authentication information comprises identification information for the proxy server. The method may further include performing a validation process for the proxy server based at least in part on the authentication information, transmitting an authorization message for use by the user device based at least in part on a successful result of the validation process, receiving, from the user device, a second login request and the authorization message, and initiating a login procedure for the user device based at least in part on receiving the second login request and the authorization message.

An apparatus for user device authentication is described. The apparatus may include a processor, memory in electronic communication with the processor, and instructions stored in the memory. The instructions may be operable to cause the processor to receive, from a proxy server, a first login request and authentication information based at least in part on a certificate of a user device, wherein the authentication information comprises identification information for the proxy server. The instructions may be further operable to cause the processor to perform a validation process for the proxy server based at least in part on the authentication information, transmit an authorization message for use by the user device based at least in part on a successful result of the validation process, receive, from the user device, a second login request and the authorization message, and initiate a login procedure for the user device based at least in part on receiving the second login request and the authorization message.

A non-transitory computer-readable medium for user device authentication is described. The non-transitory computer-readable medium may include instructions operable to cause a processor to receive, from a proxy server, a first login request and authentication information based at least in part on a certificate of a user device, wherein the authentication information comprises identification information for the proxy server. The instructions may be further operable to cause the processor to perform a validation process for the proxy server based at least in part on the authentication information, transmit an authorization message for use by the user device based at least in part on a successful result of the validation process, receive, from the user device, a second login request and the authorization message, and initiate a login procedure for the user device based at least in part on receiving the second login request and the authorization message.

In some examples of the method, apparatus, and non-transitory computer-readable medium described above, the authentication information comprises a proxy server-specific secret, and wherein performing the validation process for the proxy server comprises identifying the proxy server based at least in part on the proxy server-specific secret and an IP address associated with the proxy server.

In some examples of the method, apparatus, and non-transitory computer-readable medium described above, the login procedure comprises receiving, from the user device, one or more user identifiers for the login procedure. Some examples of the method, apparatus, and non-transitory computer-readable medium described above may further include processes, features, means, or instructions for authenticating the user device for access to an application platform based at least in part on the one or more user identifiers. In some examples of the method, apparatus, and non-transitory computer-readable medium described above, the authenticating allows the user device to communicate with the application platform without routing data through the proxy server. In some examples of the method, apparatus, and non-transitory computer-readable medium described above, the one or more user identifiers comprise a username, a password, a PIN, a biometric input, or a combination thereof.

Some examples of the method, apparatus, and non-transitory computer-readable medium described above may further include processes, features, means, or instructions for encrypting the authorization message for transmission using an encryption key. Some examples of the method, apparatus, and non-transitory computer-readable medium described above may further include processes, features, means, or instructions for decrypting the authorization message received from the user device using the encryption key.

Some examples of the method, apparatus, and non-transitory computer-readable medium described above may further include processes, features, means, or instructions for receiving, from the user device, an initial login request. Some examples of the method, apparatus, and non-transitory computer-readable medium described above may further include processes, features, means, or instructions for identifying that the initial login request does not include the authentication information or the authorization message. Some examples of the method, apparatus, and non-transitory computer-readable medium described above may further include processes, features, means, or instructions for redirecting the initial login request to the proxy server based at least in part on the identifying, wherein receiving, from the proxy server, the first login request and the authentication information may be based at least in part on the redirecting.

In some examples of the method, apparatus, and non-transitory computer-readable medium described above, the authentication information comprises an indication of a successful mTLS process between the proxy server and the user device, the successful mTLS process based at least in part on the certificate of the user device.

Some examples of the method, apparatus, and non-transitory computer-readable medium described above may further include processes, features, means, or instructions for receiving, from the proxy server, an additional login request and an additional indication of an unsuccessful mTLS process between the proxy server and an additional user device, the unsuccessful mTLS process based at least in part on an invalid certificate of the additional user device. Some examples of the method, apparatus, and non-transitory computer-readable medium described above may further include processes, features, means, or instructions for transmitting a message indicating that the additional user device may be not authorized for the login procedure based at least in part on the additional indication of the unsuccessful mTLS process.

In some examples of the method, apparatus, and non-transitory computer-readable medium described above, transmitting the authorization message for use by the user device comprises relaying the authorization message through the proxy server to the user device. In some examples of the method, apparatus, and non-transitory computer-readable medium described above, receiving the second login request and the authorization message comprises receiving the second login request and the authorization message directly from the user device without routing data through the proxy server.

In some examples of the method, apparatus, and non-transitory computer-readable medium described above, the authorization message comprises an IP address and a timestamp, and wherein initiating the login procedure comprises validating the IP address and the timestamp.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for user device authentication at an application platform providing a single sign-on (SSO) service for user devices to access one or more cloud-based applications, comprising:

receiving, at the application platform and from a user device, an initial login request;

redirecting the initial login request to a proxy server based at least in part on the initial login request lacking authentication information or an authorization message;

receiving, at the application platform and from the proxy server, a first login request and the authentication information based at least in part on a certificate of the user device, wherein the authentication information comprises identification information for the proxy server, wherein receiving, at the application platform and from the proxy server, the first login request and the authentication information is based at least in part on the redirecting;

performing a validation process for the proxy server based at least in part on the authentication information;

transmitting the authorization message for use by the user device based at least in part on a successful result of the validation process;

receiving, at the application platform and from the user device, a second login request and the authorization message;

initiating a login procedure for the user device based at least in part on receiving the second login request and the authorization message; and authenticating, at the application platform, the user device for access to the application platform based at least in part on the login procedure and receiving the second login request and the authorization message at the application platform, wherein the authenticating at the application platform allows the user device to communicate with the application platform via a route bypassing the proxy server.

2. The method of claim 1, wherein the authentication information comprises a proxy server-specific secret, and wherein performing the validation process for the proxy server comprises:

identifying the proxy server based at least in part on the proxy server-specific secret and an Internet Protocol (IP) address associated with the proxy server.

3. The method of claim 1, wherein the login procedure comprises:

receiving, from the user device, one or more user identifiers for the login procedure, wherein the user device is authenticated for access to the application platform further based at least in part on the one or more user identifiers.

4. The method of claim 3, wherein the one or more user identifiers comprise a username, a password, a personal identification number (PIN), a biometric input, or a combination thereof.

5. The method of claim 1, further comprising:

encrypting the authorization message for transmission using an encryption key; and decrypting the authorization message received from the user device using the encryption key.

6. The method of claim 1, wherein the authentication information comprises an indication of a successful mutual transport level security (mTLS) process between the proxy server and the user device, the successful mTLS process based at least in part on the certificate of the user device.

7. The method of claim 6, further comprising:

receiving, at the application platform and from the proxy server, an additional login request and an additional indication of an unsuccessful mTLS process between the proxy server and an additional user device, the unsuccessful mTLS process based at least in part on an invalid certificate of the additional user device; and transmitting a message indicating that the additional user device is not authorized for the login procedure based at least in part on the additional indication of the unsuccessful mTLS process.

8. The method of claim 1, wherein transmitting the authorization message for use by the user device comprises:

relaying the authorization message from the application platform, through the proxy server, and to the user device.

9. The method of claim 1, wherein receiving the second login request and the authorization message comprises:

receiving the second login request and the authorization message directly from the user device without routing data through the proxy server.

10. The method of claim 1, wherein the authorization message comprises an Internet Protocol (IP) address and a timestamp, and wherein initiating the login procedure comprises:

validating the IP address and the timestamp.

11. An apparatus for user device authentication at an application platform providing a single sign-on (SSO) service for user devices to access one or more cloud-based applications, comprising:

a processor;

memory in electronic communication with the processor; and instructions stored in the memory and executable by the processor to cause the apparatus to:

receive, at the application platform and from a user device, an initial login request;

redirect the initial login request to a proxy server based at least in part on the initial login request lacking authentication information or an authorization message;

receive, at the application platform and from the proxy server, a first login request and the authentication information based at least in part on a certificate of the user device, wherein the authentication information comprises identification information for the proxy server, wherein receiving, at the application platform and from the proxy server, the first login request and the authentication information is based at least in part on the redirecting;

perform a validation process for the proxy server based at least in part on the authentication information;

transmit the authorization message for use by the user device based at least in part on a successful result of the validation process;

receive, at the application platform and from the user device, a second login request and the authorization message;

initiate a login procedure for the user device based at least in part on receiving the second login request and the authorization message; and authenticate, at the application platform, the user device for access to the application platform based at least in part on the login procedure and receiving the second login request and the authorization message at the application platform, wherein the authenticating at the application platform allows the user device to communicate with the application platform via a route bypassing the proxy server.

12. The apparatus of claim 11, wherein the authentication information comprises a proxy server-specific secret, and wherein the instructions to perform the validation process for the proxy server are further executable by the processor to cause the apparatus to:

identify the proxy server based at least in part on the proxy server-specific secret and an Internet Protocol (IP) address associated with the proxy server.

13. The apparatus of claim 11, wherein the login procedure comprises further instructions executable by the processor to cause the apparatus to:

receive, from the user device, one or more user identifiers for the login procedure, wherein the user device is authenticated for access to the application platform further based at least in part on the one or more user identifiers.

14. The apparatus of claim 11, wherein the instructions are further executable by the processor to cause the apparatus to:

encrypt the authorization message for transmission using an encryption key; and decrypt the authorization message received from the user device using the encryption key.

15. A non-transitory computer-readable medium storing code for user device authentication at an application platform providing a single sign-on (SSO) service for user devices to access one or more cloud-based applications, the code comprising instructions executable by a processor to:
- receive, at the application platform and from a user device, an initial login request;
- redirect the initial login request to a proxy server based at least in part on the initial login request lacking authentication information or an authorization message;
- receive, at the application platform and from the proxy server, a first login request and the authentication information based at least in part on a certificate of the user device, wherein the authentication information comprises identification information for the proxy server, wherein receiving, at the application platform and from the proxy server, the first login request and the authentication information is based at least in part on the redirecting;
- perform a validation process for the proxy server based at least in part on the authentication information;
- transmit the authorization message for use by the user device based at least in part on a successful result of the validation process;
- receive, at the application platform and from the user device, a second login request and the authorization message;
- initiate a login procedure for the user device based at least in part on receiving the second login request and the authorization message; and
- authenticate, at the application platform, the user device for access to the application platform based at least in part on the login procedure and receiving the second login request and the authorization message at the application platform, wherein the authenticating at the application platform allows the user device to communicate with the application platform via a route bypassing the proxy server.

16. The non-transitory computer-readable medium of claim 15, wherein the authentication information comprises a proxy server-specific secret, and wherein the instructions to perform the validation process for the proxy server are further executable by the processor to:
- identify the proxy server based at least in part on the proxy server-specific secret and an Internet Protocol (IP) address associated with the proxy server.

17. The non-transitory computer-readable medium of claim 15, wherein the login procedure comprises further instructions executable by the processor to:
- receive, from the user device, one or more user identifiers for the login procedure, wherein the user device is authenticated for access to the application platform further based at least in part on the one or more user identifiers.

18. The non-transitory computer-readable medium of claim 15, wherein the instructions are further executable by the processor to:
- encrypt the authorization message for transmission using an encryption key; and
- decrypt the authorization message received from the user device using the encryption key.

19. The method of claim 1, further comprising:
- refraining from transmitting a login form to the user device in response to the initial login request; and
- transmitting the login form to the user device in response to the second login request and the authorization message.

* * * * *